UNITED STATES PATENT OFFICE.

MARCUS GARRISON, OF STONE CHURCH, PENNSYLVANIA.

WELDING COMPOUND.

SPECIFICATION forming part of Letters Patent No. 425,418, dated April 15, 1890.

Application filed October 14, 1889. Serial No. 326,976. (No specimens.)

*To all whom it may concern:*

Be it known that I, MARCUS GARRISON, a citizen of the United States of America, residing at Stone Church, in the county of Northampton and State of Pennsylvania, have invented certain new and useful Improvements in Welding Compounds, of which the following is a specification.

My invention pertains to an improvement in welding compounds for welding metals, substantially as hereinafter more fully described.

In the preparation of my welding compound I take nine parts of borax, one part of carbonate of iron, two parts of clay, and four parts of iron filings or small particles of iron, which I thoroughly intermingle. This form of compound for welding metal is extremely efficient for welding all manner of steel, as steel springs, and especially known as "Bessemer steel," and with this compound welding may be effected at a lower temperature than hitherto. Besides, this compound may be placed on the steel while the fire is in full blast without detriment or wasting the same, and it prevents the scales from sticking to the steel as the clay loosens them. The iron filings replenish the waste caused by heat and the carbonate of iron restores the steel to its precise condition before it was heated. Thus not only an economy of time and labor is effected, but better and more efficient results produced than hitherto.

Having thus fully described my invention, what I claim, and desire to secure by Letters Patent, is—

A welding compound consisting of borax, carbonate of iron, clay, and small particles of iron filings, in about the proportions substantially as set forth.

In testimony whereof I affix my signature in presence of two witnesses.

MARCUS GARRISON.

Witnesses:
G. W. MACKEY,
J. B. WILLIAMS.